United States Patent [19]

Summerfield

[11] 4,044,990

[45] Aug. 30, 1977

[54] FLEXIBLE TUBULAR MEMBERS AND VALVES INCORPORATING SUCH MEMBERS

[75] Inventor: Francis Summerfield, Leeds, England

[73] Assignee: Alvasum (Aseptic) Limited, Pudsey, England

[21] Appl. No.: 545,369

[22] Filed: Jan. 30, 1975

Related U.S. Application Data

[63] Continuation-in-part of Ser. No. 330,661, Feb. 8, 1973, abandoned.

[30] Foreign Application Priority Data

Feb. 18, 1972  United Kingdom ............... 7560/72
Feb. 22, 1972  United Kingdom ............... 8011/72

[51] Int. Cl.² ........................................... F16K 7/06
[52] U.S. Cl. ............................... 251/8; 138/126
[58] Field of Search ............................. 251/4–0; 138/126

[56] References Cited

U.S. PATENT DOCUMENTS

| 2,212,733 | 8/1940 | Grigsby | 251/8 |
|---|---|---|---|
| 2,483,954 | 10/1949 | Weiss | 251/9 X |
| 2,615,668 | 10/1952 | Ernest | 251/7 |
| 2,825,524 | 3/1958 | Fox | 251/8 |
| 2,939,488 | 6/1960 | Bacon | 138/126 |
| 3,350,053 | 10/1967 | Schmitz | 251/5 |

FOREIGN PATENT DOCUMENTS

| 588,793 | 11/1933 | Germany | 251/7 |
|---|---|---|---|
| 504,449 | 8/1930 | Germany | 251/8 |
| 93,511 | 3/1959 | Norway | 251/8 |

Primary Examiner—Martin P. Schwadron
Assistant Examiner—Richard Gerard
Attorney, Agent, or Firm—Harrington A. Lackey

[57] ABSTRACT

A flexible tubular member for use in a pinch valve and through which fluid medium will flow in operation of the valve said member having in its bore diametrically spaced shoulders over which the immediately adjacent portions of the tube wrap as the tube is pinched closed by a valve plunger of suitable shape. The outside of the tube is surrounded by a fabric sleeve which lends circumferential strength to the assembly of tube and sleeve when the tube contains fluent medium under high pressure. The sleeve is such however to enable the assembly to be radially pinched at will to stop or control flow of the fluent medium through the tube.

5 Claims, 15 Drawing Figures

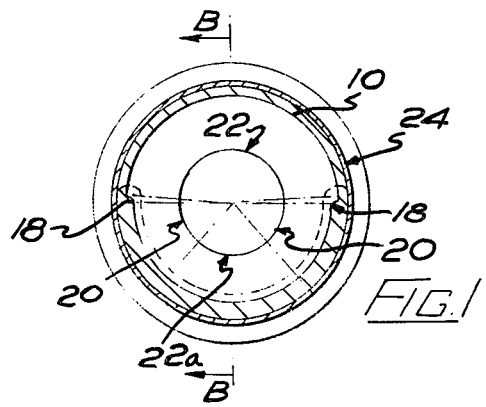
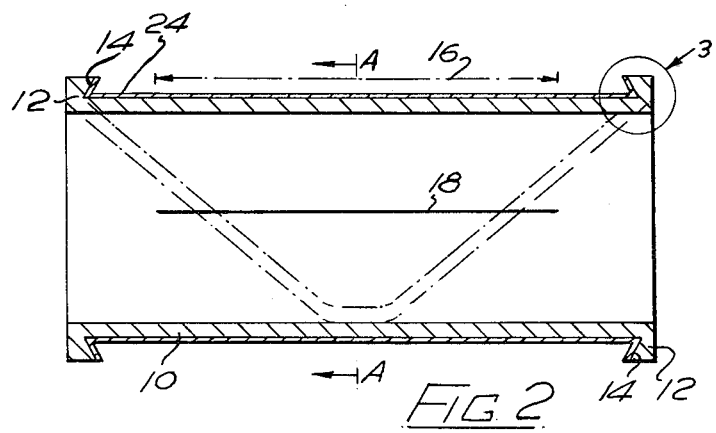
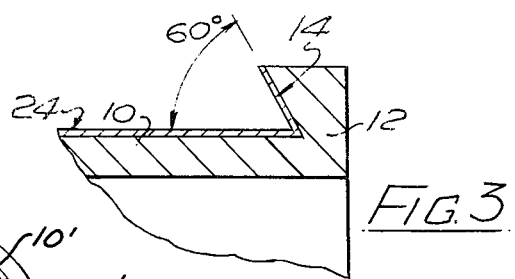
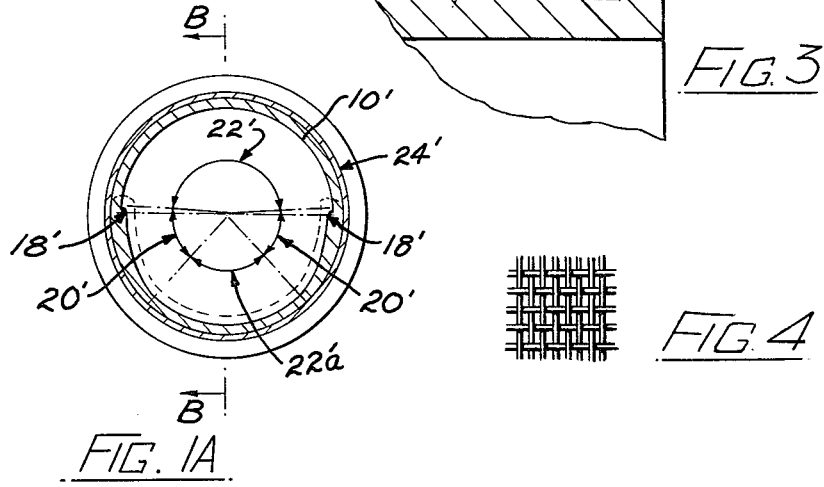

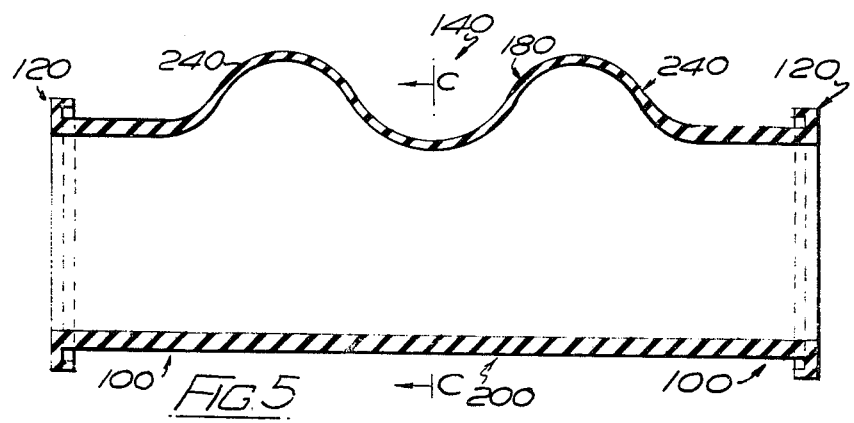
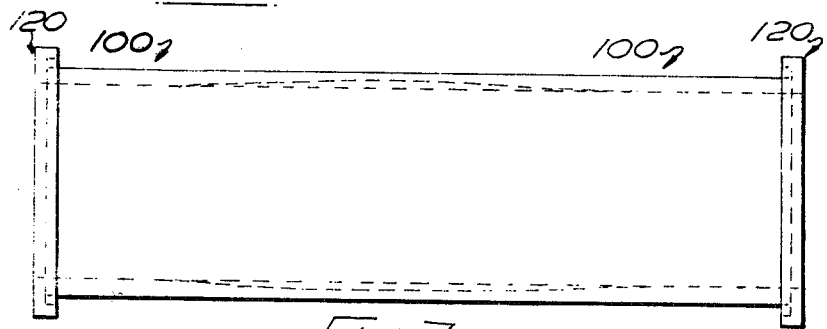
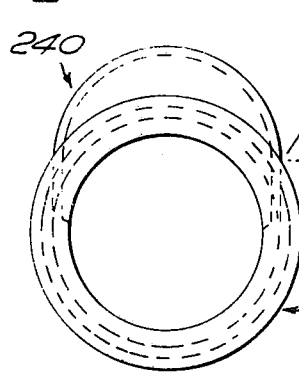
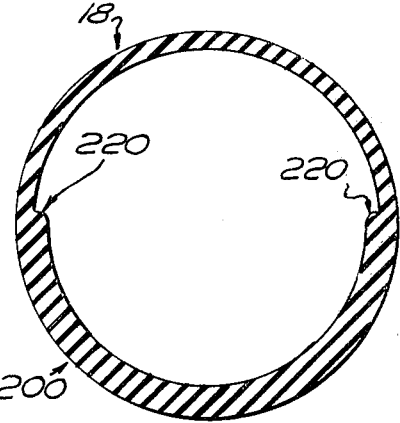
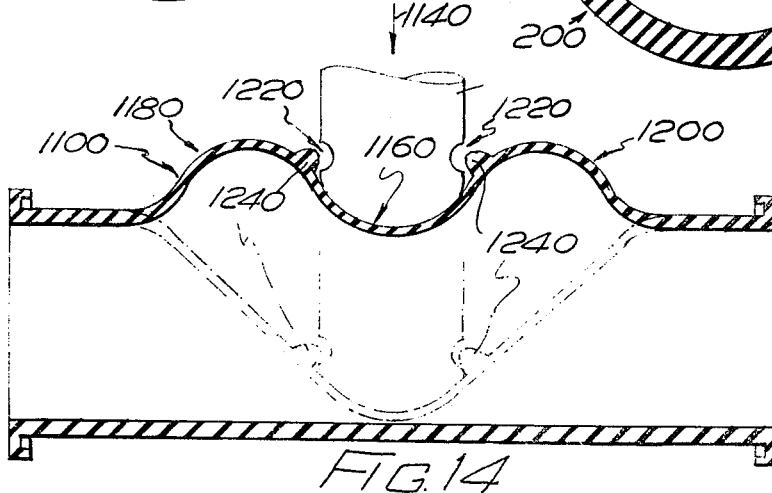

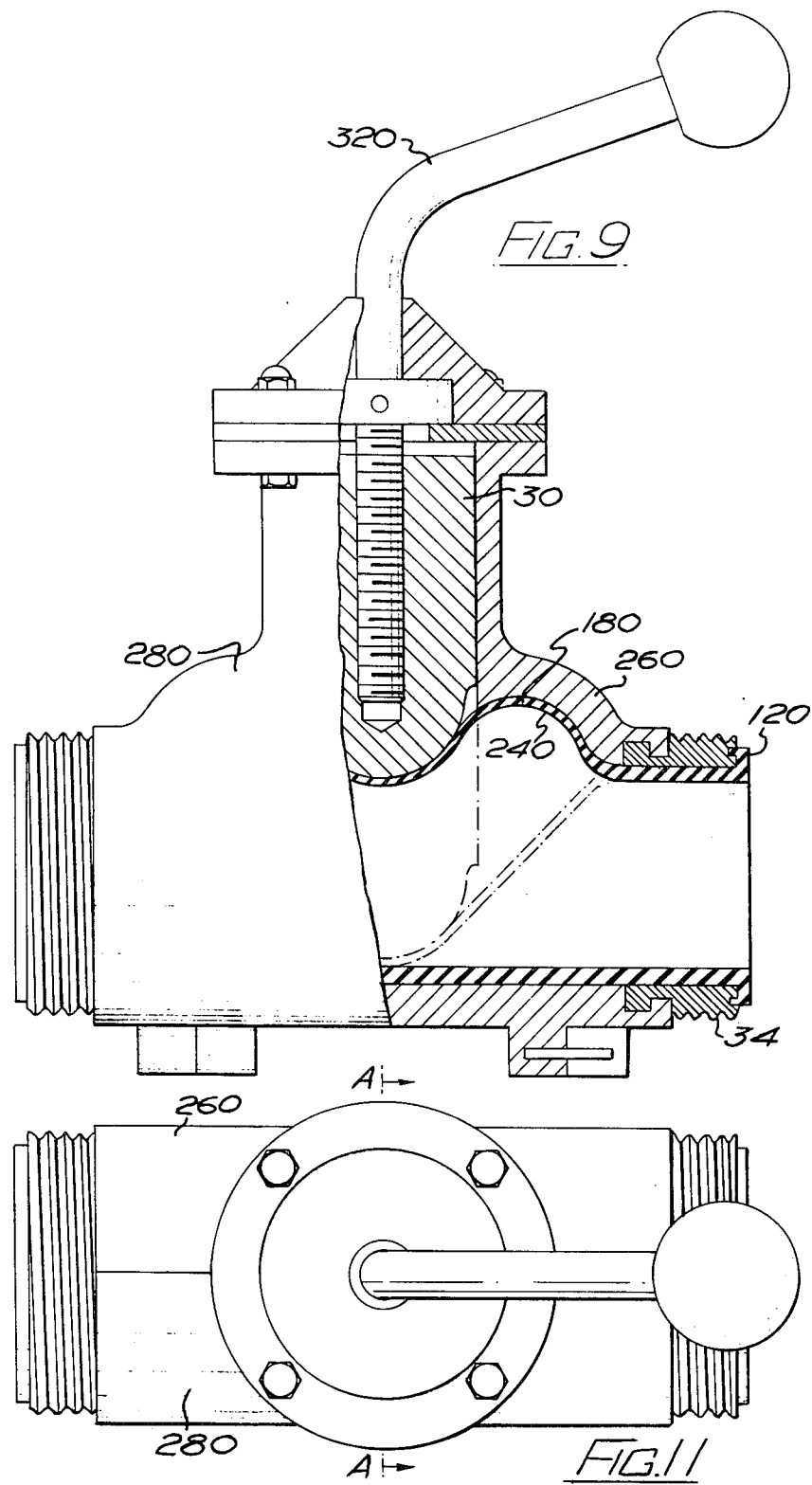

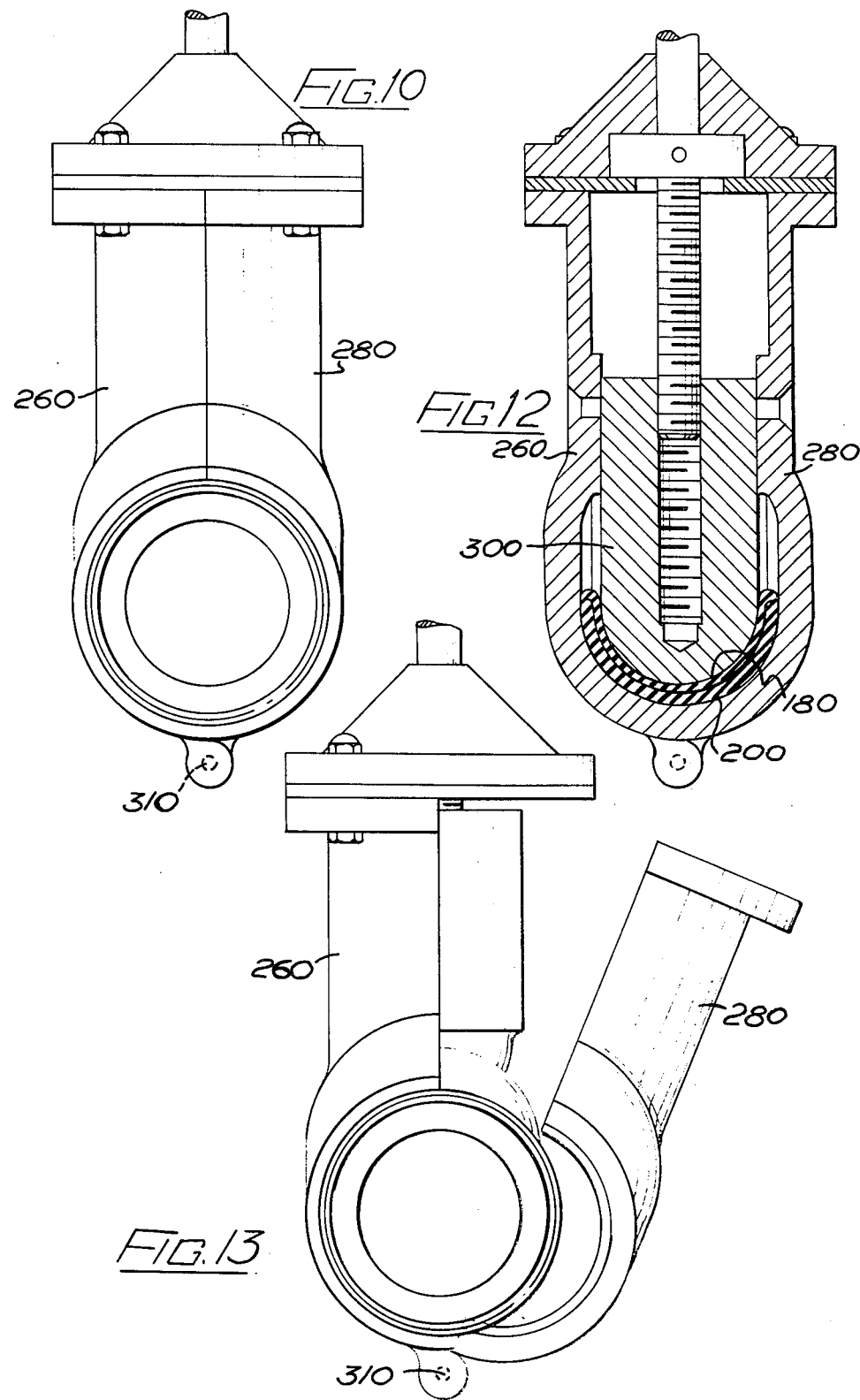

FLEXIBLE TUBULAR MEMBERS AND VALVES INCORPORATING SUCH MEMBERS

This invention relates to flexible tubular members and assemblies, and is a continuation-in-part of my application Ser. No. 330,661 filed Feb. 8, 1973, now abandoned.

FIELD OF THE INVENTION AND DISCUSSION OF PRIOR ART

This invention has particular application to flexible tubes of a type which are suitable for carrying fluent materials such as paste, granular material, liquids, slurries and so on and which are also capable of being squeezed either in one case to block off or control flow of the fluent material along the tube, or to act as a pumping membrane in a rotary pump.

Conventionally, flexible tubes of this type are not capable of withstanding high internal pressures, i.e. pressures in excess of 100 p.s.i. and to date have therefore only found limited use.

Attempts have been made to produce flexible tubes of this type which will withstand higher internal pressures but such tubes have been usually moulded in rubber and of a greater thickness, the tube wall embodying a canvas reinforcement embedded in the wall of the tube, such canvas being so embedded by being located in the mould during the moulding of the tube. The production of such flexible tubes is difficult and costly, making the tubes themselves expensive to buy. The difficulty of producing the tubes arises because of several factors including movement of the canvas, which ideally should be in the middle of the wall of the tube, with equal thickness of rubber on each side. Because of this possible movement of the canvas, the tubes cannot be made thin. Further factors making the production of the flexible tubes are temperature control and moulding pressure control.

When flexible tubes are of excessive thickness and have canvas reinforcement, much higher forces are required to flex and pinch the tube. Heavy flexing forces tend to cause breakdown of the tube and these known flexible tubes which operate at the higher pressures tend to have a shorter life than flexible tubes which are not reinforced but which operate at lower pressures.

Manufacturers of these flexible tubes express the view that for the best production control using the best mouldings techniques for rubber, it is preferable to mould thin sectioned tubes, without integral reinforcement, using the best rubber compounds which are available. Such tubes have a long life when used at low internal pressures, but of course cannot withstand high internal pressure for any length of time without destructing or fracturing.

Thus, on the one hand the manufacturers prefer to produce thin section rubber tubes with internal reinforcement, and on the other hand, this limitation hinders the wider use of flexible tubes. The only existing proposal for strengthening the rubber tubes, using canvas embedded in the rubber is, for the reasons stated above, commercially and structurally inefficient.

The tubes of the present invention have application to pinch valves.

Known pinch valves employ simply a constant cross section, constant wall thickness, flexible tube through which the fluent medium passes. Closing of such valves is simply by pinching the tube between a seat and a piston or anvil. This leads to the difficulty that regions of high cracking stress are created at opposite sides of the tube and in the bore thereof, at the two folds which occur when such tubes are pinched closed. These regions of high cracking stress result in that the service lives of these conventional tubes are short. Furthermore, if such cracks do appear in the bore of such tubes, they become traps for bacteria, and this is totally unacceptable where the tube must operate under aseptic conditions, as the tube of present invention is expected to do. It is believed that it is for these reasons that pinch valves, which have many desirable characteristics have not been more widely adopted, and it is furthermore believed that the present invention provides a tubular member which can be used in a pinch valve operating under aseptic conditions and will have a longer service life than conventional tubular members used in pinch valves.

OBJECTIVES OF THE INVENTION

It is a principal object of the invention to provide a flexible tube for a pinch valve which enables the pinch valve to be operated under aseptic conditions.

It is a further object of the invention to provide a tube for a pinch valve which can be flexed repeatedly and will stand such flexing better than tubes conventionally used in such valves.

A further object of the invention is to provide a tube assembly for a pinch valve which will withstand high internal pressures, without the flexible tube being ruptured, although it is made in minimum thickness.

A further object of the invention is to provide a tube of circular outer section so that it can be used in valve casings having circular bores.

A further object of the invention is to provide a flexible tube for a pinch valve will be stressed only by a small amount in being flexed between tube unpinched and tube pinched positions.

A still further object of the invention is to provide a flexible tube which is constructed so as to be capable of positive retraction from the pinched closed position.

BRIEF DESCRIPTION OF THE INVENTION

The present invention is concerned with the novel construction of flexible tubular member which will give more effective closing of the valve in which it is used, although tubular members constructed according to the invention can be used in other applications for example, in peristaltic pumps.

According to the present invention, a flexible tubular member has in its bore and over at least an axial region between the ends thereof opposing shoulders over which the immediately adjacent portions of the tube wrap as the tube is pinched closed. The said shoulders preferably taper away to nothing in the direction towards the ends of the tubular member.

In another aspect of the invention, there is a fabric sleeve located around the flexible tubular member, such sleeve being woven or knitted construction which can withstand higher internal pressures than the flexible tubular member, but which flexed with the tube in the pinching thereof. The tubular member will normally be of rubber, although other materials such as synthetic plastics materials can be used. The sleeve, which preferably is of tubular, plain weave construction, may have the warp yarns lying axially of the tubular member, and the weft yarns lying circumferentially of such tubular member. By varying the amount of weft yarns relative to the warp yarns the circumferential strength of the sleeve in relation to the pinching flexibility can be varied in order to achieve the best characteristics for use in a pinch value where the ends of the sleeve and tubular member may well be anchored, but the assembly has to retain circumferential strength coupled with pinchability.

Suitable yarns for the sleeve are yarns of polyester yarns and/or yarns of nylon.

In a principal aspect of the invention, the tubular member is of circular outer cross section, but the internal shoulders are in diametrically opposite, right-angled quadrants, and the tubular member is of constant thickness over the two remaining quadrants to the cross-section.

The ends of the tubular member are preferably circular in cross section as is the central cross section of said region, but a wall portion may, if desired, have outwardly directed bulges to each side of the central cross section, so that when the tubular member is used in a pinch valve the plunger or pinch valve can engage the tubular member between the bulges. These outwardly directed bulges may allow the tube to roll instead of stretch as it is pinched closed and the bulges will tend to assist in returning the tube to its open condition when the pinching force is released.

The invention also provides a pinch valve having a tubular member or a tubular assembly of member and sleeve as aforesaid.

Embodiments of the invention will now be described, by way of example, with reference to the accompanying drawings wherein:-

FIG. 1 is a sectional elevation of a tube assembly according to the invention, the section being taken on line AA of FIG. 2;

FIG. 1A is a sectional elevation of a tube assembly according to a modified form of the invention, taken along the line A—A of FIG. 2.

FIG. 2 is a longitudinal section of the tube assembly shown in FIG. 1, the section being taken on the line BB of FIG. 1;

FIG. 3 is an enlarged sectional elevation showing the detail ringed in FIG. 2;

FIG. 4 shows a portion of the fabric outer sleeve used in the tube assembly of FIGS. 1 and 2, in order to show the weave pattern of such fabric sleeve;

FIG. 5 is a sectional side elevation of a tubular member according to another embodiment of the invention;

FIGS. 6, 7 and 8 are respectively an end view, an underneath plan, and a sectional end elevation taken on the line CC of FIG. 5 of the tubular member of FIGS. 5 to 8;

FIG. 9 is a half sectional elevation of a pinch valve incorporating the tubular member of FIGS. 5 to 8;

FIGS. 10, 11 and 12 are respectively an end elevation, plan and a sectional end elevation taken on the line AA of FIG. 11 of the valve shown in FIG. 9;

FIG. 13 is an end elevation similar to FIG. 10, but showing the valve casing in partly open condition; and FIG. 14 is a sectional elevation of a further modified tubular member for a pinch valve, and this figure also shows the relationship of the member and a modified piston to be used therewith.

Referring to the drawings and firstly to FIGS. 1 to 4, the tube assembly according to the present embodiment comprises an inner flexible tube 10 of rubber or the like material. The tube 10 has a circular outer crosssection, and terminates in end flanges 12 having reverse directed ribs 14.

The bore of the tube 10 is of circular even cross section except over a central region designated in FIG. 2 by reference 16. Over this central region, the tube has internal shoulders 18 which are basically diametrically opposite. Towards the ends of region 16 the shoulders 18 taper to nothing only over the region 16, the shoulders 18 are formed each within a segment defined by angle 20 (see FIG. 1). In the preferred case, this angle 20 is slightly greater than 45°. The portions of the inner surface of tube 10 and into the circular inner wall of the tube 10. As well as being formed to opposite sides of the shoulders are of circular section so that the tubular member 10, in cross-section, is of constant thickness to one side of the shoulders 18, defining a thick tube portion, and of constant thickness to the other side of the shoulders 18, defining a thin tube portion. Each of the thick and thin portions extend circumferentially over approximately one-half of the circumference of the tube wall.

In a modified arrangement of FIG. 1A, the same reference numerals as in FIG. 1, but accompanied by a prime mark, have been used for distinction. In the arrangement of FIG. 1A, the shoulders 18' are again contained within opposed segments defined by angles 20' of approximately 45°, but each of the other segments defined by angles 22' and 22'a, respectively, sub-tends a portion of the tubular member wall which is of constant, equal thickness.

The reason for providing the shoulders 18, is to ensure that when the tube assembly is used in a pinch valve having a circular bore, and the tube assembly is pinched closed as shown in dotted lines in FIG. 1, the portion of the tube to one side of the shoulders wraps smoothly over the shoulders and into the other portion of the tube to the outside of the shoulders, ensuring that there is no creation of high stress points in the region of the shoulders, as would occur if no shoulders were provided.

In comparison with known flexible tubes, the tubes 10 can be made of high quality rubber compound, and can be relativey thin so that, in accordance with manufacturer's views, the tube can be of the highest quality from a production point of view.

Such a tube could not in itself hope to withstand a relatively high internal pressure of 100 lbs. per sq. inch and more, and in order that the tube may carry fluent material at such pressure, it is surround by a circular fabric sleeve 24 which can be knitted or woven, although in this example a plain tubular weave as shown in FIG. 4 is used for the fabric. The sleeve can serve as an insulator, and will protect the external surface of the rubber tube. The fabric is of a construction and of material so that it can withstand much higher internal pressures than can the tube 10. In fact, in use of the assembly as shown, it is envisaged that the stresses on the tube assembly created by high internal pressures will be absorbed almost entirely by the fabric sleeve.

The yarns of the sleeve, which can be self lubricated during manufacture, are arranged such that the wrap threads extend axially of the sleeve, whilst the weft threads extend circumferentially of the sleeve. By this arrangement, variation in the relative strength characteristics of the sleeve in the axial and circumferential directions can be varied. When the tube assembly is to be used for a pinch valve for example, as in the present case, it is preferable to have less strength axially of the sleeve than circumferentially. This is because the tube must flex to the closed position indicated in dotted lines in FIG. 2, and because during normal use there will be little or no axial stress on the tube assembly even although the assembly carries a fluent material at a pressure in excess of 100 lbs per sq. inch.

The sleeve may be constructed of the yarns of any suitable material, and in the present example yarns of nylon (Registered Trade Mark) and/or polyester are preferred. With such yarns, the sleeve can be cut to length by means of a hot knife, which melts and seals the ends of the yarns together, which prevents laddering of the sleeve in use. The sleeve can of course be separable from the tube 10, although in the present example it is preferred that the sleeve end is formed, by a heat setting tool, to follow the end flanges 12 and rims 14 as shown in FIG. 3. This ensures that when the tube assembly is in position in a pinch valve, the ends of the tube 10 and also the ends of the sleeve 24 will be held anchored by the connecting flanges of the valve and pipes to which the valve is connected.

It is preferred that the tube assembly be straight where indicated in FIG. 2, when it is for use in a pinch valve, and furthermore the specific internal bore shape of the tube 10 is shown is preferred, as the valve can be used in any position provided that the lowest point of the bore of tube 10 lies within either of the segments defined by angles 22, 22a because in any such position the valve will be self-draining, which is highly desirable when the valve is to be used under aseptic conditions.

In a particularly suitable construction for the fabric sleeve, this has a circumference of 7.25 inches and the warp is based on 840 den. bright high tenacity nylon yarn with a tenacity of 8.5 G.P.D. which gives a strength of just over 7 kg. for each individual end. In the warp there are 500 of these ends at 70 ends per inch. When tested as a tube pulling in the warp direction this gives a strength of 3,500 kg. This high strength is essential to give the basic structure a good strength factor and also good elasticity when flexed in use.

For the weft yarn various yarns have been used but these may be either bright high tenacity polyester or bright high tenacity nylon. The range used to date goes from 400 den. weft up to 2,000 den. in the form of 2 fold 1,000 den. polyester. The function of the weft in this tubular fabric is to give high resistance to stretch when the tube is under pressure. This is achieved by combining the number of threads per inch together with the denier or thickness of the yarn used. By using a high number of weft picks per inch 32 to 48 with the correct yarn it is possible to resist pressures of up to 300 lbs per sq. inch comfortably. The choice of yarn for the weft will also govern both the resistance to strength and the elasticity of the webbing when in use under pressure. It is possible by this novel weaving application to make changes to suit any requirements called for.

Six examples based on the same basic nylon warp of 500 ends of 840 denier nylon are given below. The weft and picks per inch were changed to vary the resistance to internal pressure.

Sample 9 — 38 picks 1,000 terylene weft 1,000 terylene spool

Sample 10 — 32 picks 2/1,000 terylene weft 2/1,000 spool terylene

Sample 11 — 32 picks 1,770 nylon B weft 940 spool nylon

Sample 12 — 36 picks 1,770 nylon weft 940 spool nylon

Sample 13 — 36 picks 1,770 nylon weft 1,770 spool nylon

Sample 14 — 40 picks 940 nylon wefts 2/940 Bt. nylon spool

All samples were woven 3½ inches wide flat.

The described tube assembly of the invention of course has other applications. For example a tube assembly comprising tubular member and sleeve according to the invention can be suitably constructed for use as a pumping machine in a rotary pump, and there are other applications requiring a tube assembly which is capable of withstanding high internal pressure, and is also capable of being flexed radially.

When a tube assembly such as has been described with reference to the drawings is used in a pinch valve, the outer sleeve 24 takes all of the stress created by the higher pressure in the tube assembly, and the valve casing is relatively free of such pressure, enabling a much lighter gauge valve casing to be used, which is desirable. Furthermore, the pinching forces necessary to close the valve are much less than those required for pinching an equivalent high pressure flexible tube of conventional construction and embodying canvas in the tube wall thickness.

On referring to FIGS. 5 to 13 of the drawings, it will be seen that the tubular member according to the embodiment, which is constructed of a flexible rubber-like material, has no external fabric sleeve but has cylindrical end portions 100, which are of constant wall thickness and each of which is provided with a connecting flange 120 for the mounting of the tubular member in a pinch valve. Between the end portions 100 is a central region 140 having diametrically opposed wall portions 180 and 200 of which wall portion 180 is thin relative to wall portion 200. Wall portion 200 is of the same wall thickness as the end portions 100. In cross section at the centre of region 140, the tube is circular, as shown in FIG. 8, and the thick wall portion 200 and thin wall portion 180 each extend approximately over half of the wall length and at each location where the thin portion 180 meets the thick portion 200, the wall thickness is stepped, as at 220, to provide an axially extending shoulder which tapers to nothing towards the cylindrical end portions 100. The circumferential extent of thick wall section 200 is slightly greater than thin wall section 180. This is to ensure that the inner surface of thin wall section 18 which at the section of FIG. 8 is at greater radius, will lie on the inner surface of thick wall section 200 which is of lesser radius, when the tube is pinched closed, without undue strain being placed on the tube.

To each side of the central section, the thin wall portion 180 is provided with outwardly projecting bulges 240 so that the tubular member at the thin wall portion 180 can be engaged between the bulges 240 by a pinch valve plunger, for example, as illustrated in FIG. 9.

Referring now to FIGS. 9 to 12, it will be observed that the valve in which the tubular member is located, comprises basically a pair of similar valve body halves 260, 280 which together define a T-shaped interior space with the tubular member extending in the arms of this T space and the valve plunger 300 being located in the leg of the T. Where the leg meets the arms, the valve body is shaped as shown to accommodate the bulges 240 in the tubular member, the rounded end of plunger 300 engaging the tubular member between the bulges. The valve shown in the drawings is operated simply by means of an operator's handle 320 and by turning this handle 320, plunger 300 is forced to move up or down in FIG. 9. The lower limit of movement of the plunger 300 is illustrated in chain dotted lines in FIG. 9 and it will be noticed in this position, that the thin tubular member section 180 is pressed into firm contact with the inside of the thick wall portion 200. FIG. 12 shows clearly how the tube is pinched in the closed position of the valve. The bulges 240 are formed in the tubular member so that the tube is not or not substantially stretched in being moved from the fully open position, shown in full lines in FIG. 9, and the fully closed position, shown in full lines in FIG. 12. Thus, in closing the valve, the tube wall section 180 will tend to roll to the valve closed position and wrap around the shoulders 220 in the immediate vicinity of same. The bulges 240 help to open the tube when the plunger is retracted from the valve closing position. FIG. 13 shows how the valve body halves 260 and 280 can be pivoted apart about their axis of pivotal connection 310 to enable the tubular member to be removed for cleaning and, if necessary replacement. FIG. 9 shows the mounting collars 340 to which the end flanges 120 of the tubular member are operatively connected.

By providing the internal shoulders 220 so as to achieve the wrapping round of the thin portion 180, it is provided that the known difficulty with tubes of pinch valves, that they tend quickly to crack interiorly where folded, and create bacteria traps, is avoided.

In the arrangement shown in FIG. 14, the flexible tube is indicated by numeral 1,100, whereas the plunger is indicated by numeral 1,120. It is to be understood that the plunger 1,120 can be moved downwards as indicated by arrow 1,140 to pinch the tube 1,100 as shown in dotted lines to close the valve and the plunger retracted in the opposite direction to open the valve as described in relation to the previous embodiment. The fluent medium passing through the valve will of course pass along tube 1,100.

The plunger 1,120 is shown as a circular sectioned component having a rounded end 1,160 where it engages tube 1,100. The tube 100 has, as previously two outwardly extending bulges 1,180, 1,120 at opposite sides of where the tube is engaged by plunger 1,120. The purpose of these bulges is to enable the tube section, which is deflected when the plunger moves to close the valve, to roll rather than to stretch so that the section is not stressed in the valve closing positon.

If the medium which flows through the valve is such as would tend to make the opposed sections of the tube stick together, when the valve is closed and then the plunger 1,120 is retracted, there is always the possibility, even although it is a small possibility as in the majority of cases the medium will be under pressure, that the valve may not again open efficiently.

According to the modification included in FIG. 14, use is made of the rolling action of the tube 110 to mitigate the aforesaid possibility. To this end, the plunger 1,120 in its tube engaging end region is provided with a pair of diametrically opposed recesses 1,220 and the tube is provided with two external protuberances 1,240 which is respectively are rolled at least partially into said recesses 1,220 as shown in dotted lines as the tube 1100 is pinched closed by the plunger 1,120. Thus, if the tube tends to remain pinched closed when plunger 1,120 is retracted a positive pull will be exerted on the tube through said protuberances 1,240 tending to pull and assisting in pulling the tube open.

If the tube opens normally protuberances 1,240 simply will roll out of the recesses 1,220 to the initial position shown in the drawing in full lines.

In an alternative embodiment, the protuberances may be arranged to remain in the plunger recesses at all times, ensuring that pulling assistance is available for opening a sticking flexible member.

The design and number of protuberances may require to be varied to suit any particular application.

In a modification (not shown) the tube is provided on its outside and at the bottom in FIG. 8 with an integral key or tab and the housing halves 260, 280 are suitably recesses to receive this key or tab and to grip same when the valve housing is closed. This arrangement serves to hold the bottom of the housing. This may be desirable where the valve controls the flow of a medium which will tend to make the tube portions 180, 200 stick together in the pinched position.

By providing the tubular member with a thin wall portion which moves in the closing and opening of the valve there is ensured a better control of the closing of the valve and the shoulders 220 furthermore ensure that there is no creation of an excessively thick portion when the tubular member is pinched closed, as illustrated in FIG. 12, but rather the thin wall portion wraps round these shoulders 220 as shown clearly in FIG. 12. Moreover, the thick wall portion 200 gives a good seating and by making the wall portion 180 of thinner section, then operation of the valve as between the closed and open positions is easier and requires less effort.

It is of course not essential that the tube be provided with the bulges 1180, 1200 as will be evident from the embodiment of FIGS. 1 to 4. It could be straight with no such bulges as shown in FIGS. 1 to 4 or it could be of another shape suitable to the plunger with which it will operate as long as the tube wrap round the shoulders as it is pinched closed.

It will furthermore be appreciated that the tubular assembly of FIGS. 1 to 4 will be used with valve casing having a straight, circular section bore, i.e. without the recesses for reception of bulges 240, and the bore would be of such size to accommodate the fabric sleeve.

The construction of the valve is not of prime importance to this invention and the drawings illustrate only one example of valve. The tubular member or assembly can be used with modified valves however, and in such modified valves the plunger may be operated by a power means such as an air cylinder or electrically or hydraulically. Moreover, the valve may be adapted for automatic operation and may be provided with means to indicate whether the valve is opened or closed.

I claim:

1. A flexible tubular member of circular cross section over an axial region between the ends thereof and having opposing shoulders at said region which divide the tube section at the shoulders into a first portion and a second portion which includes the shoulders, the circumferential internal length of the first portion being equal to the circumferential internal length of the second portion so that the tube can be pinched closed by a wrapping of the first portion into the second portion and over the shoulders, while the flexible tubular member is held in a rigid tube neatly matching the outside diameter of the flexible tubular member, said shoulders tapering away to nothing in the axial directions away from the center of the region, and wherein the tubular member in cross section is of constant thickness to one side of the shoulders defining a thick tube portion, and of constant thickness to the other side of the shoulders defining a thin tube portion and said thick and thin portions may each extend circumferentially over approximately half of the wall sectional length.

2. A tube assembly comprising a flexible tubular member of circular cross section having radially outward projecting flange formations at its ends, said tubular member having opposing shoulders over an axial region between said ends, which divide the tubular member section at its shoulders into a first portion and a second portion which includes the shoulders, the circumferential internal length of the first portion being equal to the circumferential length of the second portion so that the tubular member can be pinched closed by a wrapping of the first portion into the second portion and over the shoulders, while the flexible tubular member is held in a rigid tube neatly matching the outside diameter of the flexible tubular member, said shoulders tapering away to nothing in the axial directions away from the centre of the region, and a fabric reinforcing sleeve which extends between the said end flange formations, said sleeve having its own end formations adapted to be held securely with the flange formations of said flexible tubular member in a pinch valve, said sleeve surrounding the outside of the tubular member, which is non-adhesively separable from the tubular member, and which is constructed to reinforce the tubular member against rupture as a result of high internal pressure, and to flex when pinched.

3. A tube assembly according to claim 2, wherein the section of the tubular member at said shoulders defines two opposite segments which contain the shoulders and two further opposite segments, each of which is of constant, equal thickness.

4. A tube assembly according to claim 3, wherein the tube assembly is straight, and apart from the shoulders is of constant circular section.

5. A pinch valve including a valve casing defining a circular bore, a tube assembly neatly matched to and located in said bore, said tube assembly comprising an internal flexible tubular member having radially outwardly projecting flange formations at its ends and surrounded by a sleeve of fabric which is non-adhesively separable from the tubular member and which extends between said end flange formations, said sleeve having its own end formations adapted to be held securely by the flange formations of said flexible tubular member, said sleeve serving to reinforce the tubular member against rupture as a result of high internal pressure, and which flexes when pinched, said tubular member being of circular cross section over an axial region between the ends thereof, and having opposing shoulders at said region which divide the tube section at said shoulders into a first portion and a second portion which includes the shoulders, the circumferential internal length of the first portion being equal to the circumferential internal length of the second portion, said shoulders tapering away to nothing in the axial directions away from the centre of the region, and the valve including pinching means for pinching the assembly by a wrapping of the first portion into the second portion and over the shoulders while the tube assembly is supported in the bore of the casing.

* * * * *